Figure 1:
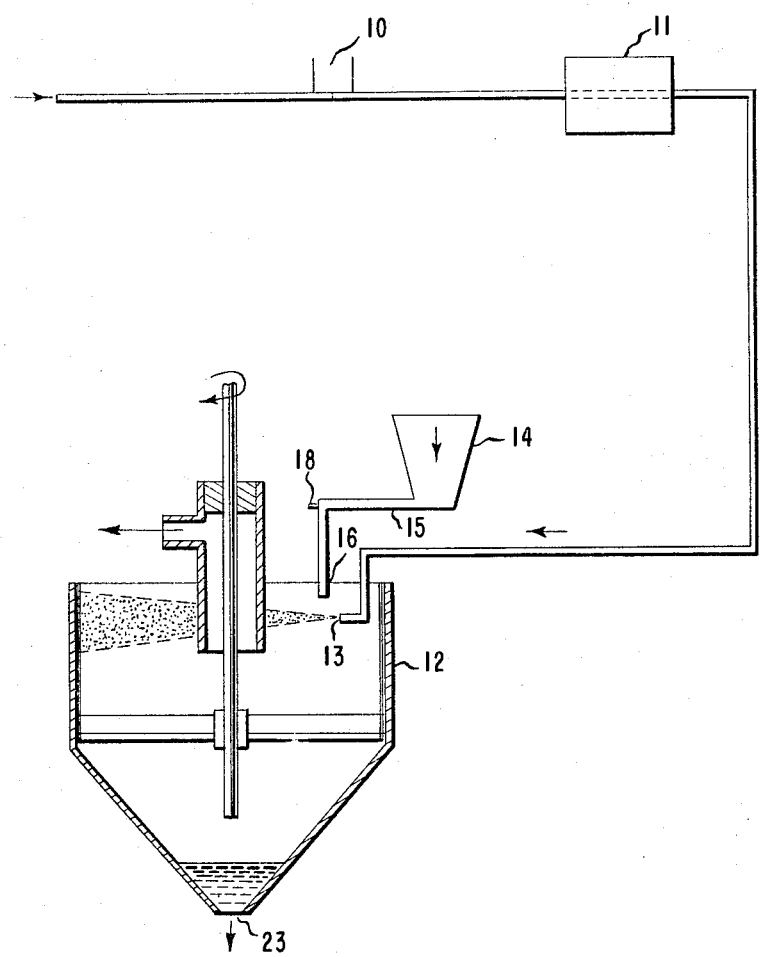

Sept. 6, 1966 W. F. BRONDYKE 3,271,017
APPARATUS FOR MELTING PLASTIC POWDER
Filed April 24, 1964 2 Sheets-Sheet 1

INVENTOR
WILLIS F. BRONDYKE

BY *Robert C. Hodgson*
AGENT

Sept. 6, 1966   W. F. BRONDYKE   3,271,017
APPARATUS FOR MELTING PLASTIC POWDER
Filed April 24, 1964   2 Sheets-Sheet 2
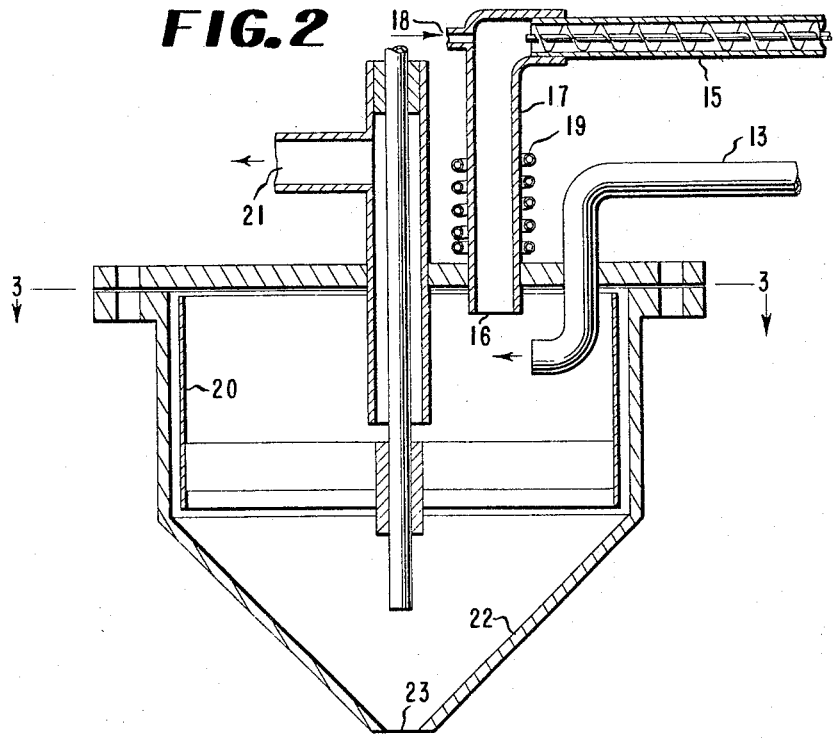
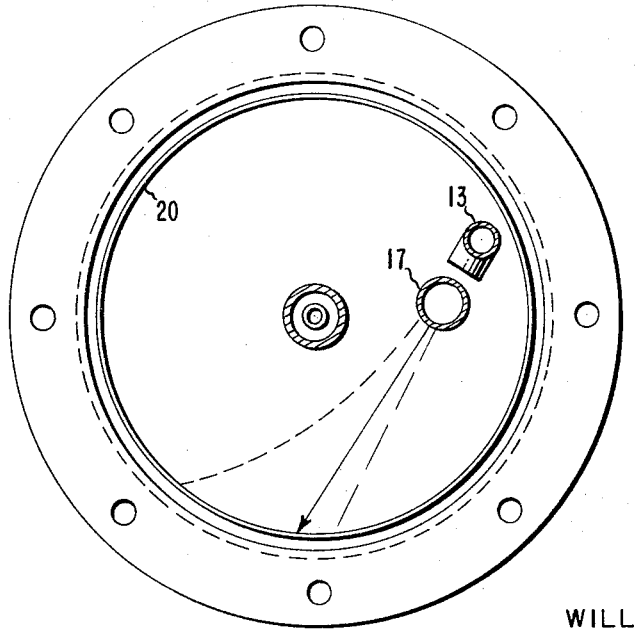
INVENTOR
WILLIS F. BRONDYKE
BY *Albert C. Hodgson*
AGENT United States Patent Office 3,271,017
Patented Sept. 6, 1966

3,271,017
APPARATUS FOR MELTING PLASTIC POWDER
Willis F. Brondyke, Wilmington, Del., assignor to E. I. du Pont de Nemours and Company, Wilmington, Del., a corporation of Delaware
Filed Apr. 24, 1964, Ser. No. 362,447
3 Claims. (Cl. 263—7)

This invention relates to apparatus for melting plastic powder and more particularly to apparatus for melting plastic powder to render it more readily transportable and saleable.

Many plastic materials such as polyethylene and polypropylene are manufactured in the form of a low bulk density powder. Since this powder is difficult to pack, handle and transport, a further processing step is preferred in order to obtain a more readily handled product. This processing step constitutes conversion of the plastic powder into a densified form suitable for transport and sale. Heretofore, the dry powder recovered from the initial processing had to be both melted and pumped in a plasticating extruder and then formed into pellets by cutting in order to obtain a more suitable product. Such extrusion is a relatively expensive operation, both in investment and operating cost.

It is an object, therefore, of this invention to provide apparatus which will satisfactorily convert the plastic powder into a saleable form which is readily transportable and may be easily handled at a much lower cost than was heretofore possible. A further object is to provide an apparatus which will continuously convert plastic powder into a readily transportable plastic material. Other objects will be readily apparent from the following spcifications and claims and the appended drawing.

These objects are accomplished by a device capable of melting low bulk density polymer powder such as polypropylene and polyethylene powders at contact times as short as 0.02 second. In this apparatus the plastic powder is entrained, melted and deposited on an internally rotating wall by a hot gas jet. The rotating wall permits collection of the viscous polymer melt without the high cost and work output of extruder technique.

The accompanying drawing is illustrative of a suitable embodiment of the present invention but is not intended to be limiting. FIGURE 1 is a schematic representation of a plastic powder melting system. FIGURE 2 is a cross-sectional view of the melting chamber of FIGURE 1, illustrating the powder melting chamber and its associated equipment. FIGURE 3 is a cross-sectional view taken along the lines 3—3 of FIGURE 2.

The operation of the powder melting apparatus depends upon the large surface area per pound exhibited by the powders, the high coefficient of heat transfer to small particles in a stagnant medium and the concept of the rotating wall separator. In general, it is preferred to employ a polymer powder having a bulk density in the range of 10 to 30 lbs./ft.$^3$ and a particle size in the order of 30 to 50 microns. In greater detail and referring to the drawings, an inert gas such as nitrogen, steam, carbon dioxide, the product of an inert gas generator or the like is fed from a source (not shown) and metered to a venturimeter 10 and thence to a tubular furnace 11. In the furnace the inert gas is heated to a sufficient degree to carry out the operation. The inert gas then passes into the melt chamber indicated generally 12 through the inlet port 13. The gas is pressurized to an extent suitable to drive the gas through the apparatus. The plastic powder to be melted is delivered from a source 14 into a screw conveyor 15 and thence through inlet port 16 into the melt chamber 12. While passing from the screw conveyer 15, the plastic powder is premixed with a quantity of relatively cool inert gas delivered through entrance port 18. By premixing inert gas at the same pressure as that of the chamber 12 with the plastic powder a pressure equilibrium is established, thereby preventing the hot inert gas within the chamber 12 from entering the inlet port 16 and premelting the plastic powder therein, causing a blockage of the inlet port 16. While the plastic powder, inert gas mixture is passing through the delivery tube 17, the mixture is cooled by cooling coils 19 to prevent build-up of sintered powder at the inlet port 16. As the plastic powder, inert gas mixture enters the furnace chamber 12, it encounters a jet of preheated inert gas from the delivery tube 13 which renders the plastic powder molten and directs it onto the rotating furnace wall 20. The delivery tube 13 is preferably positioned within the furnace chamber in such a manner that the inert gas emerging therefrom has imparted thereto a downward centrifugal motion. The velocity of the gas is high. The high velocity of the gas and its downward centrifugal motion coact in carrying the molten plastic particles to the furnace wall 20. The furnace wall 20 is preferably rotated slowly in order to spread the plastic uniformly and to avoid build-up of a mass of plastic at any one point. Such build-up would interfere with the centrifugal gas flow pattern within the chamber.

In large capacity operations a plurality of plastic powder inlet ports 16 may be employed in conjunction with a plurality of inert gas delivery tubes 13.

The furnace wall 20 is driven by a motive source (not shown). The inert gas, after driving the molten plastic powder onto the furnace wall exits through exit port 21. The inert gas must be at a sufficient temperature and of such quantity relative to the quantity of plastic powder supplied that the difference in heat quantity of the gas at inlet and exit is sufficient to melt the plastic. The inert gas may then be recycled.

The plastic powder is viscous in nature upon deposition on the wall 20 and flows down the sides of the rotating wall onto the conical portion 22 of the furnace chamber, from thence it flows down to the exit port 23 where it emerges as a viscous stream. This stream may be cut by any conventional means (not shown) to produce pelletized plastic material. The pelletized plastic material upon soldification is suitable for transport and shipment.

Pelletized material containing additives may be produced in this device. Non-volatile additives such as pigments, fillers, stabilizers and the like may be admixed with the plastic powder before the powder is fed into the furnace chamber.

Melt blending may be readily accomplished by this apparatus by feeding two or more different plastic powders into a common inlet port.

I claim:
1. An apparatus for melting particulate plastic material which comprises a cylindrical chamber, a cylindrical wall mounted longitudinally in said chamber for rotational movement therein, means to rotate said wall, feed means to deliver said plastic material into said chamber at a point within said cylindrical wall and means disposed within said cylindrical wall at a point adjacent said feed means to render said plastic material molten upon delivery within said cylindrical wall and to deposit said plastic material on said cylindrical wall.

2. The apparatus of claim 1 including cooling means disposed at the point where said plastic powder enters said chamber.

3. The apparatus of claim 2 including means to premix inert gas with said plastic powder prior to delivery into said chamber to maintain pressure equilibrium within said feed means.

References Cited by the Examiner
UNITED STATES PATENTS

| | | | |
|---|---|---|---|
| 2,530,078 | 11/1950 | Ramsing | 266—33 |
| 2,958,161 | 11/1960 | Palmer | 263—29 X |
| 2,978,238 | 4/1961 | Crull | 263—7 |

FREDERICK L. MATTESON, Jr., *Primary Examiner.*

JOHN J. CAMBY, *Examiner.*

D. A. TAMBURRO, *Assistant Examiner.*